United States Patent [19]

Vancauwenberghe

[11] 4,179,264

[45] Dec. 18, 1979

[54] METHOD FOR EXPANDING PERLITE

[75] Inventor: Gerard R. Vancauwenberghe, St. Denijs Westrem, Belgium

[73] Assignee: Dicalite Europe Nord, S.A., Brussels, Belgium

[21] Appl. No.: 849,592

[22] Filed: Nov. 8, 1977

[30] Foreign Application Priority Data

Nov. 9, 1976 [BE] Belgium ............................... 0172205

[51] Int. Cl.² ............................................. F27B 15/00
[52] U.S. Cl. .................................... 432/13; 252/378 P
[58] Field of Search ............... 432/13; 252/378, 378 P

[56] References Cited

U.S. PATENT DOCUMENTS

| 2,431,884 | 12/1947 | Neuschotz | 432/13 |
| 2,602,782 | 7/1952 | Zoradi | 432/13 |
| 2,676,892 | 4/1954 | McLaughlin | 252/378 R |
| 3,201,099 | 8/1965 | Carpenter | 432/13 X |

Primary Examiner—John J. Camby
Attorney, Agent, or Firm—Brian G. Brunsvold; Herbert H. Mintz; Everett H. Murray, Jr.

[57] ABSTRACT

Particulate unexpanded perlite is introduced to an expansion apparatus that utilizes the combustion of a gas as a source of heat. The particulate perlite is mixed with a combustible gas, air from a first source and oxygen and thereafter introduced to a burner section. The amount of oxygen introduced is in the range of from 1.5 to 16 weight percent of the amount of air introduced. The amount of combustible gas in the mixture is related to the air input from the first source, being in the range of 1 volume of combustible gas to 2 to 6 volumes of air.

7 Claims, No Drawings

METHOD FOR EXPANDING PERLITE

BACKGROUND OF THE INVENTION

The present invention relates to a method for expanding perlite. The expanded product of the invention has advantageous properties for numerous uses and particularly as a filteraid.

Perlite is a silicious material of volcanic origin, which has a silica content greater than 65% by weight and a combined water content of about 2 to 5% by weight. In addition to silica and water, perlite contains variable quantities of compounds of aluminum, sodium and potassium among others.

When perlite in the form of particles is introduced into a flame, it is subjected to expansion, or "bursts" into a material of lighter weight and density. Generally speaking, the expansion or "bursting" is observed when perlite is heated to a temperature on the order of 760° to 1315° C., according to the origin of the perlite and its particle size. For purposes of the present invention, temperatures on the order of about 870° to 1150° C. are used.

As a general rule, unexpanded perlite ore has a density on the order of about 0.96 to 1.28 kg/dm$^3$ while after expansion, this density is on the order of about 0.032 to 0.16 kg/dm$^3$.

Various techniques are known for expansion of perlite and these conventional methods have met with varying degrees of success. By reason of the continuing rise in demand for expanded perlite of better quality at a lower cost, it is desirable to substantially increase the capacity of known expansion installations, without a substantial investment of capital.

One object of the present invention is to considerably increase the production of expanded perlite and also to improve the quality thereof.

Another object is to provide a method yielding products with improved water-permeability.

Still another object of the invention is to provide a method reducing normal losses to a minimum and diminishing the quantity of floating material produced.

Additional objects and advantages of the invention will be set forth in part in the description which follows, and in part will be obvious from the description, or may be learned by practice of the invention. The objects and advantages of the invention may be realized and attained by means of the combinations particularly pointed out in the appended claims.

SUMMARY OF THE INVENTION

To achieve the foregoing objects and in accordance with the purpose of the invention, as embodied and broadly described herein, the present invention comprises a method of expanded unexpanded particulate perlite.

The unexpanded particulate perlite is mixed with a combustible gas, air and oxygen. The amount of combustible gas in the mixture is on the order of 1 volume of combustible gas for 2 to 6 volumes of air. Oxygen is introduced to the mixture in an amount comprising 1.5 to 16 weight percent of air in the mixture. The mixture is ignited, effecting combustion of the combustible gas which expands substantially all of the unexpanded particulate perlite.

Preferably, the combustible gas is natural gas which is included in the mixture in an amount on the order of 1 volume of natural gas for 2 to 4 volumes of air. In this preferred method, the oxygen is introduced to the mixture in an amount comprising 2.5 to 10 weight percent of air in the mixture. It is also preferred that the unexpanded particulate perlite have a particle size less than 575 microns and a particle size distribution of:

297 microns—20 to 30%
150 microns—30 to 50%
100 microns—5 to 20%
74 microns—5 to 12%
less than 74 microns—5 to 15%

DESCRIPTION OF THE PREFERRED EMBODIMENTS

In disclosing the invention set out in the appended claims, reference will be made to preferred methods of practicing the invention.

The unexpanded perlite used in the present invention is ground, generally speaking, to a particle size of less than 2.5 cm and is dried to a moisture content of less than 0.2% by weight, by treatment at about 26°–94° C. for 10 minutes. This constitutes a method frequently used in practice.

This conventionally treated material is then ground more finely and subjected to sorting or classification. Preferably, the starting material used in the processing according to the invention should pass through a screen with a mesh opening of 595 microns. It is preferable that the greater part of the material be retained on a screen with a mesh opening of 100 microns, a large part being retained on a screen with openings of 297 or 150 microns. It is advantageous, in order to achieve maximal results according to the invention, that appreciable quantities of the material be of a size smaller than 74 microns, for examples 2 to 20%. A typical analysis of the particle sizes (A.S.T.M. E 11-61) of a starting material which we can use appears as follows:

595 microns and less—100%
297 microns—20 to 60%
150 microns—20 to 60%
100 microns—2 to 20%
74 microns—2 to 20%
less than 74 microns—2 to 20%

A particularly advantageous starting material will have the following approximate percentages of screen retention:

297 microns—20 to 30%
150 microns—30 to 50%
100 microns—5 to 20%
74 microns—5 to 12%
less than 74 microns—5 to 15%

The unexpanded perlite is fed to the expansion apparatus by conventional methods, and it is introduced therein at such a rate that practically all of this perlite will undergo an expansion under the conditions which will be explained more completely below.

According to the ordinary methods of expansion of a perlite, air is mixed with a combustible gas, such as natural gas, and the mixture fed to the burner of the expansion apparatus. The flow of rates and the quantities of air and natural gas (principally methane) vary according to the ordinary requirements of the known methods, and characteristics of the burner and the expansion apparatus.

It is frequently desirable, in order to direct and control the process, and to be able to achieve the advantages of a heat exchange, to augment the initial air feed by an additional or secondary air feed. If this technique is used, ordinarily secondary air is fed at a point in the expansion apparatus different from the feed point of primary air. In the conventional expansion apparatus of the vertical type, a secondary air feed is ordinarily introduced at a point lying well above the position of the burner.

In the process according to the present invention, natural gas is mixed with primary air and oxygen, and this mixture is fed to the burner. Other combustible gases such as propane, butane, etc. can also be satisfactorily used in the process. One critical characteristic of the present invention is the quantity of oxygen which is added in relation to the primary air feed. On the basis of percentages by weight, it is necessary to feed oxygen to the combustible gas mixture going to the burner at the rate of about 1.5 to 16% relative to the air present in this gas mixture. It is more particularly preferable to use from about 2.5 to about 10% oxygen relative to the quantity of air existing in the initial gas mixture.

Another characteristic which is vital to the success of the process according to the invention is the ratio of combustible gas to primary air fed to the burner. This ratio, when given in volumes, is on the order of 1 volume of combustible gas for 2 to 6 volumes of normal air and preferably 1 volume of combustible gas for 2 to 4 volumes of normal air.

Secondary air is preferably fed into the mixture to insure complete combustion of the combustible gas. This secondary air can be introduced in any conventional manner known to those skilled in the art. The embodiment of the invention disclosed herein provides for the use of a vertical expansion apparatus in which the secondary air is introduced into a double or tripewalled structure to be pre-heated by heat exchange. The pre-heated secondary air is then preferably introduced into the burner zone close to its base.

Preferred results were obtained according to the method of the invention, by using about 25% normal primary air, necessary for the total combustion of the natural gas used, with an introduction of oxygen in quantities varying from 1.5 to 16% by weight relative to the quantity of primary air used.

Particular success has been experienced using a vertical expansion apparatus, employing a mixture of:
  235 m³/hours of natural gas;
  540 m³/hour of normal primary air; and
  25 to 60 m³/hour of oxygen.
To this mixture 1680 m³/hour of secondary air was introduced at the base of the burner.

An additional successful embodiment of the invention used a vertical expansion apparatus employing a mixture of:
  100 m³/hour of natural gas;
  230 m³/hour of normal primary air; and
  25 m³/hour of oxygen.
Secondary air was introduced to this embodiment at the rate of 1680 m³/hour at the base of the burner.

A high yield of product was obtained from this latter embodiment which constituted a filteraid with improved air permeability and low weight. The product also exhibited a low filter cake density and yielded a minimum quantity of floating material and waste.

This same embodiment was used under identical conditions except that oxygen was not added to the mixture of natural gas and normal primary air. The operation of the process in this manner resulted in the production of only 75% of the quantity of material produced by operation of the present invention as previously described.

Typical yields obtained with the use of the method of the invention are compared with yields obtained with conventional techniques as follows:

| Product | Conventional Technique | Method of the Invention |
|---|---|---|
| Flow at medium speed | 92% | 96% |
| Flow at medium speed | 90% | 95% |
| Flow at high speed | 76% | 85% |
| Flow at high speed | 70% | 90% |

In addition to the noted improvements in yield, rejected material is reduced by at least 50% using the process of the invention. The products described in the preceding table relate to the desired primary product. Corresponding small quantities of low yield filteraid material were also collected according to known methods.

In addition to the advantages of the invention disclosed above, it will be evident to one skilled in the art that the invention, by increasing the effective capacity of the present apparatus, reduces depreciation of such apparatus. In addition, the present invention also reduces the cost of operation of such processes, even in the face of the increasing cost of natural gas.

The invention has been disclosed in terms of preferred embodiments and it should be understood that the scope of the invention is not to be limited thereto. The scope of the invention is to be determined by the appended claims as read in light of the preceding disclosure.

What is claimed is:

1. A method of expanding unexpanded particulate perlite, comprising the steps of:
   (a) mixing said particulate perlite with a combustible gas, air and oxygen, wherein the amount of combustible gas in the mixture is on the order of 1 volume of combustible gas for 2 to 6 volumes of air and said oxygen is introduced to said mixture in an amount comprising 1.5 to 16 weight percent of said air in said mixture; and
   (b) effecting combustion of said combustible gas to expand substantially all of said particulate perlite.

2. The method of claim 1 wherein the amount of combustible gas in the mixture is on the order of 1 volume of combustible gas for 2 to 4 volumes of air.

3. The method of claim 1 wherein said oxygen is introduced to said mixture in an amount comprising 2.5 to 10 weight percent of said air in said mixture.

4. The method of claim 1, wherein said unexpanded particulate perlite has a particle size less than 595 microns and has a particle size distribution of:
   297 microns—20 to 60%
   150 microns—30 to 60%
   100 microns—2 to 20%
   74 microns—2 to 20%
   less than 74 microns—2 to 20%.

5. The method of claim 1, wherein said unexpanded particulate perlite has a particle size less than 595 microns and has a particle size distribution of:
   297 microns—20 to 30%
   150 microns—30 to 50%
   100 microns—5 to 20%
   74 microns—5 to 12%
   less than 74 microns—5 to 15%.

6. The method of claim 1 wherein the combustible gas is natural gas and wherein said natural gas is included in said mixture in an amount on the order of 1 volume of natural gas for 2 to 4 volumes of air, said oxygen being introduced to said mixture in an amount comprising 2.5 to 10 weight percent of said air in said mixture, said unexpanded particulate perlite having a particle size less than 575 microns and a particle size distribution of:

297 microns—20 to 30%
   150 microns—30 to 50%
   100 microns—5 to 20%
   74 microns—5 to 12%
   less than 74 microns—5 to 15%

7. The method of claim 6 including the step of introducing a second source of air into said mixture, said second source of air being introduced in an amount necessary to insure complete combustion of said natural gas.

* * * * *